US009134930B2

(12) United States Patent
Juchem et al.

(10) Patent No.: US 9,134,930 B2
(45) Date of Patent: Sep. 15, 2015

(54) DELAYED CONTENT PRODUCTION (75) Inventors: Murilo Juchem, Porto Alegre (BR);
Leonardo Davi Viccari, Porto Alegre
(BR); Deny Joao Correa Azzolin, Porto
Alegre (BR); Rodrigo Prati, Porto
Alegre (BR)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 103 days.

(21) Appl. No.: 13/076,025

(22) Filed: Mar. 30, 2011

(65) Prior Publication Data

US 2012/0250073 A1 Oct. 4, 2012

(51) Int. Cl.
*G06F 3/12* (2006.01)

(52) U.S. Cl.
CPC ............ *G06F 3/1204* (2013.01); *G06F 3/1226* (2013.01); *G06F 3/1267* (2013.01); *G06F 3/1285* (2013.01); *G06F 3/1228* (2013.01); *G06F 3/1292* (2013.01)

(58) Field of Classification Search
USPC ....................................................... 358/1.15
See application file for complete search history.

(56) References Cited

U.S. PATENT DOCUMENTS

| | | | |
|---|---|---|---|
| 6,678,750 B2 | 1/2004 | Meade, II et al. | |
| 6,751,732 B2 | 6/2004 | Strobel et al. | |
| 6,922,725 B2 | 7/2005 | Lamming et al. | |
| 6,952,645 B1 | 10/2005 | Jones | |
| 7,187,462 B2 | 3/2007 | Oakeson et al. | |
| 7,221,909 B2 | 5/2007 | Kiyose | |
| 7,400,425 B2 | 7/2008 | Parry | |
| 7,460,265 B2 * | 12/2008 | Keeney et al. | ............... 358/1.15 |
| 7,512,713 B2 | 3/2009 | Wang et al. | |
| 7,756,530 B2 | 7/2010 | Taniguchi et al. | |
| 7,831,216 B1 | 11/2010 | Yenney et al. | |
| 8,001,404 B2 | 8/2011 | Pathak | |
| 8,319,999 B2 | 11/2012 | Hanaoka et al. | |
| 8,339,639 B2 | 12/2012 | St. Jacques, Jr. et al. | |
| 8,346,903 B2 | 1/2013 | Shepherd | |
| 8,369,837 B2 | 2/2013 | Huang et al. | |
| 8,386,677 B2 | 2/2013 | Lydon et al. | |
| 8,482,781 B2 | 7/2013 | Steele et al. | |

(Continued)

FOREIGN PATENT DOCUMENTS

EP 1691270 8/2006
WO WO-2005069556 A1 7/2005

OTHER PUBLICATIONS

Alan Kasameyer, "The Top 6 Printing Rules for Saving Your Company Money," Nov. 7, 2011, <http://www.sepialine.com/2013/11/07/top-6-printing-rules-saving-company-money/>.

(Continued)

*Primary Examiner* — King Poon
*Assistant Examiner* — Andrew H Lam
(74) *Attorney, Agent, or Firm* — Hewlett-Packard Patent Department (57) ABSTRACT

A method for locating network resources includes determining a distance between a client device and each of a plurality of network resources. For each of the network resources, a subset of a plurality of location tags is selected. The subset for a given network resource is selected according to the distance between the client device and that network resource. The method also includes, for each of the network resources, causing a display by the client device, of values for the subset of location tags selected for that network resource.

19 Claims, 5 Drawing Sheets

(56) References Cited

U.S. PATENT DOCUMENTS

| | | | |
|---|---|---|---|
| 2002/0013869 A1* | 1/2002 | Taniguchi et al. | 710/33 |
| 2002/0191210 A1 | 12/2002 | Staas et al. | |
| 2003/0038965 A1 | 2/2003 | Simpson et al. | |
| 2003/0076526 A1* | 4/2003 | Gopalan | 358/1.15 |
| 2003/0115458 A1 | 6/2003 | Song | |
| 2004/0125401 A1 | 7/2004 | Earl et al. | |
| 2004/0137928 A1 | 7/2004 | Biundo | |
| 2005/0036663 A1 | 2/2005 | Caspi et al. | |
| 2005/0174609 A1 | 8/2005 | Thurlow | |
| 2006/0044598 A1 | 3/2006 | Etelapera | |
| 2006/0252409 A1 | 11/2006 | Brenchley et al. | |
| 2007/0124436 A1 | 5/2007 | Shepherd | |
| 2007/0127063 A1* | 6/2007 | Fertlitsch et al. | 358/1.15 |
| 2008/0158597 A1 | 7/2008 | Hashimoto et al. | |
| 2008/0239392 A1 | 10/2008 | Nanaumi | |
| 2009/0063518 A1 | 3/2009 | Jung et al. | |
| 2009/0296125 A1 | 12/2009 | Kai | |
| 2009/0319835 A1 | 12/2009 | Teranishi | |
| 2010/0020349 A1 | 1/2010 | Carroll | |
| 2010/0073707 A1 | 3/2010 | Ferlitsch | |
| 2010/0188698 A1 | 7/2010 | Koizumi | |
| 2010/0277753 A1 | 11/2010 | Shinchi | |
| 2010/0290073 A1 | 11/2010 | Nuggehalli et al. | |
| 2010/0309510 A1 | 12/2010 | Hansen | |
| 2010/0332562 A1 | 12/2010 | Emigh et al. | |
| 2011/0216349 A1* | 9/2011 | McCorkindale et al. | 358/1.15 |
| 2011/0310428 A1 | 12/2011 | Ciriza et al. | |
| 2012/0069386 A1 | 3/2012 | St. Laurent et al. | |
| 2012/0069771 A1 | 3/2012 | Tandon et al. | |
| 2012/0094694 A1 | 4/2012 | Malkin et al. | |
| 2012/0140285 A1 | 6/2012 | Kamath et al. | |
| 2012/0218600 A1 | 8/2012 | Shaw et al. | |
| 2012/0250073 A1 | 10/2012 | Juchem et al. | |
| 2012/0262753 A1 | 10/2012 | Viccari et al. | |
| 2012/0300251 A1 | 11/2012 | St. Laurent et al. | |
| 2012/0307298 A1 | 12/2012 | Ishige et al. | |
| 2012/0311585 A1 | 12/2012 | Gruber et al. | |
| 2013/0003126 A1 | 1/2013 | Van Osdol et al. | |
| 2013/0027718 A1 | 1/2013 | Fujii | |
| 2013/0083339 A1 | 4/2013 | Ebner et al. | |
| 2013/0107312 A1 | 5/2013 | Venkatesh | |
| 2013/0322401 A1 | 12/2013 | Visuri et al. | |
| 2014/0032728 A1 | 1/2014 | O'neil et al. | |
| 2014/0085663 A1 | 3/2014 | Kavanappillil et al. | |
| 2014/0240756 A1 | 8/2014 | Ganesan et al. | |

OTHER PUBLICATIONS

Dell Inc., "Dell Proximity Printing Solution," 2010, <http://www.dell.com/downloads/global/solutions/Dell_Proxmity_Print_us.pdf?c=us&l=en&s=gen>.

Gupta et al., "Adding GPS-Control to Traditional Thermostats: An Exploration of Potential Energy Savings and Design Challenges," Pervasive Computing. Springer Berlin Heidelberg, 2009, pp. 95-114, <http://web.media.mit.edu/~intille/papers-files/GuptaIntilleLarson09.pdf>.

Konica Minolta, "Pagescope Enterprise Suite 3," Oct. 2013, <http://kmbs.konicaminolta.us/wps/wcm/connect/35d0aaeb-60f8-44f2-9522-32df2184c8b5/PageScope_Brochure_Enterprise_Suite_Brochure.pdf?MOD=AJPERES&CACHEID=35d0aaeb-60f8-44f2-9522-32df2184c8b5>.

Konica Minolta, "Rule-Based Printing," Jan. 2014, <http://www.konicaminolta.eu/fileadmin/content/eu/Business_Solutions/Products/Applications/Images/Output_Management/PageScope_MyPrint_Manager_RBP_Option_Datasheet.pdf>.

Koo, S.G.M. et al., Location Discovery in Enterprise-based Wireless Networks: Case Studies and Applications, (Research Paper), May 8, 2002.

Nest Community, "Use phone's location to trigger away mode," (post and comments). Jan. 29, 2013-May 8, 2014, <https://community.nest.com/ideas/1033#>.

Nest Labs, "What is Auto-Away?," Nest Support, (web page), May 16, 2014, <http://support.nest.com/article/What-is-Auto-Away>.

Ringdale, "FollowMe Printing," (web page), May 16, 2014, <http://www.followme.ringdale.com/applications/followme_printing/>.

Skylark, "Frequently Asked Questions," May 16, 2014, <http://www.skylarkios.com/faq/>.

Skylark, "Skylark for Nest Learning Thermostat," May 16, 2014, <http://www.skylarkios.com/>.

Vision PLC, "uniFLOW—one platform for all your print, scan and device management," available Apr. 29, 2014, <http://www.visionplc.co.uk/partners/uniflow-one-platform-for-all-your-print-scan-and-device-management>.

Wikipedia, "Location-based service," May 7, 2014, <http://en.wikipedia.org/wiki/Location-based_service>.

Wikipedia, "Mobile phone tracking," May 16, 2014, <http://en.wikipedia.org/wiki/GSM_localization>.

Hewlett-Packard Development Company, L.P., "Solution and Feature Guide," HP Universal Print Driver, 2009, <http://h20331.www2.hp.com/Hpsub/downloads/UPD5_guide_final,%20web.pdf>.

USPTO, Final Office Action issued in U.S. Appl. No. 13/284,213, May 14, 2014, 17 pages.

USPTO, Non-final Office Action issued in U.S. Appl. No. 13/284,213, Dec. 2, 2013, 17 pages.

Hewlett-Packard Development Company, L.P., "Solution and Feature Guide," HP Universal Print Driver, 2009, <http://h20331.www2.hp.com/Hpsub/downloads/UPD5_guide_final,%20web.pdf.>.

Printeron, "PrinterOn Enterprise, Secure mobile printing from any device, to any printer, on any network," Enterprise Printing Solutions, (Research Paper), Jun. 15, 2012, found at http://www.printeron.com/images/docs/PrinterOnEnterprisePrintingSolutions.pdf, Jun. 15, 2012.

Tomshardware.com, "How to Wakeup a Sleeping Network Printer," (Web Page), Tom's Hardware > Forum > Computer Peripherals > Printers > How to wakeup a sleeping network printer, 2000-2009, 3 pages, available at: <tomshardware.com/forum/62523-3-wakeup-sleeping-network-printer>.

USPTO, Final Office Action issued in U.S. Appl. No. 13/076,025, Dec. 30, 2013.

USPTO, Final Office Action issued in U.S. Appl. No. 13/076,025, Mar. 15, 2013.

USPTO, Non-final Office Action issued in U.S. Appl. No. 13/076,025, Oct. 30, 2012.

USPTO, Non-final Office Action issued in U.S. Appl. No. 13/076,025, Sep. 13, 2013.

Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov, 2008. <http://h71028.www7.hp.com/enterprise/downloads/HP-Access-Control-Secure-Pull-Printing.pdf>.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

International Searching Authority, International Search Report and Written Opinion, issued in PCT Application No. PCT/US2015/012034, Mar. 30, 2015, 12 pages.

JR Raphael, "How free Google services can help shrink your phone bill," Oct. 11, 2012, Computerworld.com, <http://www.computerworld.com/article/2473314/mobile-wireless/how-free-google-services-can-help-shrink-your-phone-bill.html>.

Tricerat, "Proximity Printing," Sep. 20, 2013, <http://web.archive.org/web/20130928094836/http://www.triceral.com/resources/topics-library/proximity-printing>.

USPTO, Final Office Action issued in U.S. Appl. No. 13/284,213, Apr. 9, 2015.

* cited by examiner

DELAYED CONTENT PRODUCTION

BACKGROUND

Mobile device users frequently desire to print content items such as web pages, documents, and spreadsheets. However, such users are at times unaware of when or where a printer will become available. When a printer becomes available, a content item, such as a final confirmation for an on-line transaction, may no longer be available or at least not readily available. The ensuing frustration, at times, results in the user not printing and losing the content item. Some inelegant approaches taken when a printer is not available have included e-mailing or saving the content item for later retrieval and printing. Such approaches rely on the user to remember that the content item was saved or sent and require multiple additional steps when the user simply desired to print.

DETAILED DESCRIPTION

Introduction:

Various embodiments described below were developed to enable a mobile device user to capture an intent to print a content item at a time when a printer having a desired characteristic is not available printer. Later, a printer having the desired characteristic is automatically caused to produce the content item. A content item, as used herein, is any electronic information that can be printed. Examples include electronic files containing text, images, and combinations thereof. Desired characteristics can include locations known to the user or compatible features.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
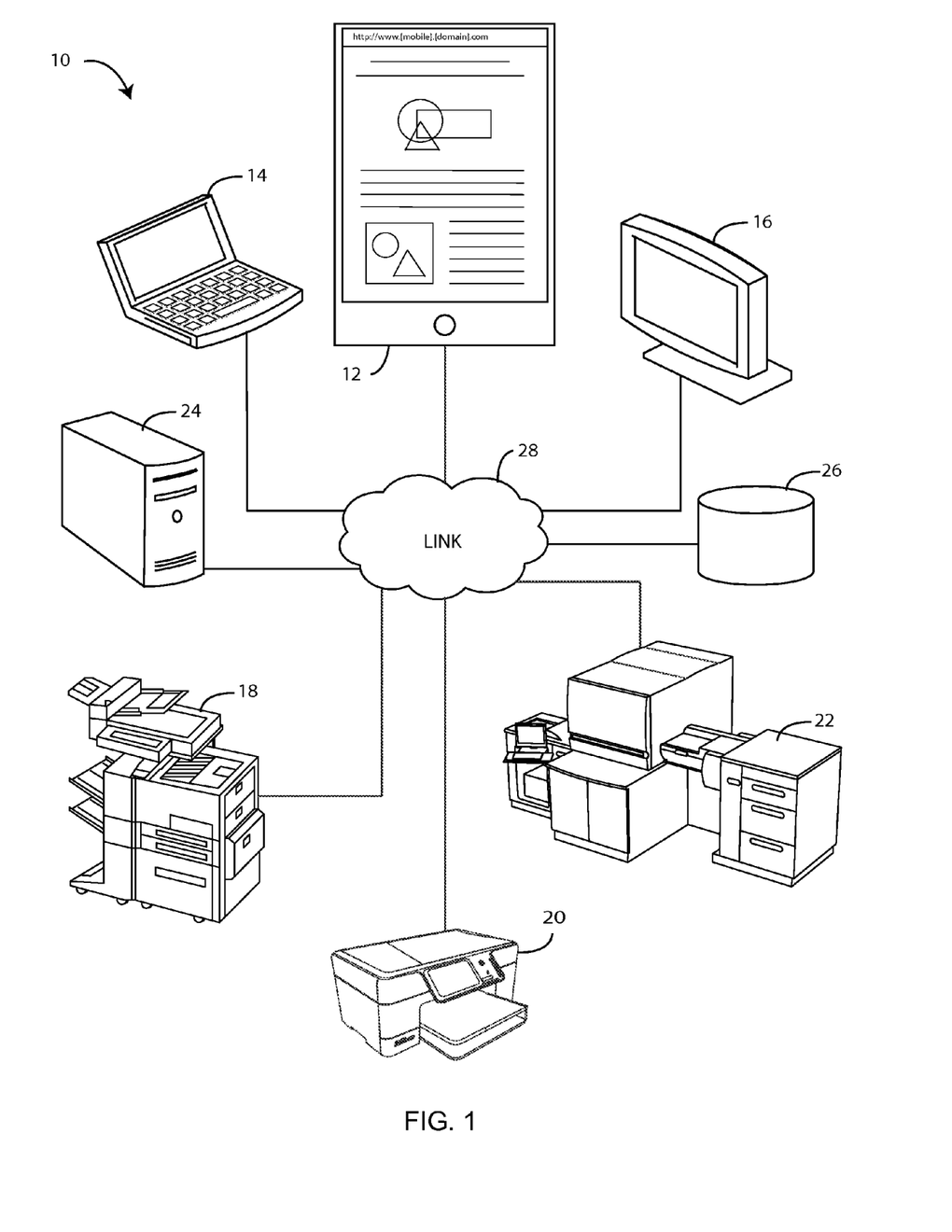
FIG. 1 depicts an environment in which various embodiments may be implemented.

Environment:

FIG. 1 depicts an exemplary environment 10 in which various embodiments may be implemented. Environment 10 is shown to include client devices 12, 14, and 16, printers 18, 20, and 22, production service 24, and data store 26. While environment 10 is shown to include three client devices 12-16 and three printers 18-22, environment 10 may include any number of such components.

Client devices 12-16 each represent generally any computing device capable of network communication though which a user's intent to print a content item can be captured. In the example of FIG. 1, devices 12 and 14 are shown as mobile devices, a smart phone and laptop or net-book respectively. Device 16 is depicted as a workstation or desktop computer. Device 12 and 14 are mobile in that they are configured to travel with a user. Device 16, while it can be moved, is intended to maintain a generally fixed position such as at a desk or kiosk. Printers 18-22 represent generally any devices or combination of devices configured to produce a physical printed representation of a content item. In the Example of FIG. 1, printer 18 may be a monochrome laser printer located in an office. Printer 20 may be a color ink printer located in a home, and printer 22 may be a commercial printing system located in a commercial printing facility.

Production service 24 represents generally a network service configured to capture a user's intent to print a content item or otherwise aid a client device 12-16 in capturing that intent. In particular, the user's intent to print is captured at a time when none of printers 18-22 have a desired characteristic. In an example, that characteristic may be printer 18, 20, or 22 sharing a general geographic location with a client device 12, 14, or 16 that is under the user's control. In another example, the desired characteristic may be a feature such as the ability to print color or print photos. Production service 24 is also responsible for causing a printer 18, 20, or 22 to produce the content item upon a determination that the given printer 18, 20 or 22 has the desired characteristic.

Data store 26 represents any device or collection of devices for storing data that can be accessed by production service 24 and client devices 12-16. Data store may be integrated into one or more of client device 12-16 and production service 24, or it may be separate device or group of devices. Stored data can include information for determining whether a printer 8-22 has a desired characteristic. Stored data may also include content items or representation's thereof for which a user's desire to print has been captured. In an example, capturing a user's intent to print a content item can include communicating the content item to data store 26. Upon a determination that a printer 18-22 has a desired characteristic, the content item or its representation can be acquired from data store 26 and used to cause that printer to produce the content item.

Components 12-26 are interconnected via link 28. Link 28 represents generally one or more of a cable, wireless, fiber optic, or remote connections via a telecommunication link, an infrared link, a radio frequency link, or any other connectors or systems that provide electronic communication. Link 28 may include, at least in part, an intranet, the Internet, or a combination of both. Link 28 may also include intermediate proxies, routers, switches, load balancers, and the like. The paths followed by link 28 between components 12-26 as depicted in FIG. 1 represent the logical communication paths between these devices, not necessarily the physical paths between the devices.

Figure 2:
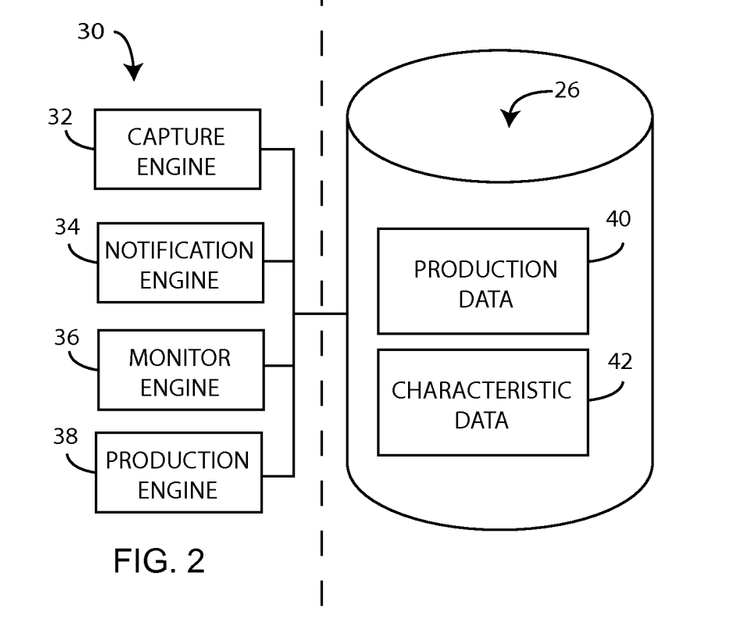
FIG. 2 depicts a delayed production system according to an embodiment.

Components:

FIG. 2 depicts various physical and logical components for implementing various embodiments. In particular, FIG. 2 depicts delayed production system 30 in communication with data store 26. System 30 includes capture engine 32, notification engine 34, monitor engine 36, and production engine 38. Data store 26 is show to include production data 40 and characteristic data 42. Referring back to FIG. 1, each component 32-38 may be implemented on a client device 12-16, production service 24 or distributed across the devices.

Capture engine 32 represents generally any combination of hardware and programming configured to capture a user's intent to print a content item. A user's intent may be captured by storing the content item or a representation thereof. A representation of a content item may include a reference such as an URL (Uniform Resource Locator) for retrieving the content item. A representation can also include a PDF (Portable Document Format) or other print ready representation rendered from the content item. Thus, capture engine 32 may perform its function in a number of fashions. It may communicate the content item for storage as production data 40 in data store 26. It may communicate a reference for acquiring the content item for storage as production data 40 in data store 26. Capture engine 32 may communicate a print ready version of the content item for storage as production data 40 in data store 26.

In an example, discussed below with respect to FIG. 4, capture engine 32 may be triggered by a user selecting a print action from a client device 12, 14, or 16 at a time when none of a plurality of printers has a desired characteristic. Characteristics can include location and features. Thus, a desired characteristic can be a desired or known location—that is—a location shared with a client device under a user's control. A desired characteristic can include the ability to print in color or print photos. Notification engine 34 represents generally any combination of hardware and programming configured to cause a user to be notified when one of the plurality of printers has the desired characteristic. An example of such a notification is discussed below with respect to FIG. 5 where a notification takes the form of a user interface through which a user can select content items for which a user's intent to print has been captured.

Monitor engine 36 represents generally any combination of hardware and programming configured to determine if any of a plurality of printers has a desired characteristic. In performing its function, monitor engine may access characteristic data 42 an example of which is discussed below with respect to FIG. 3. When no printer has a desired characteristic, monitor engine 36 causes capture engine 32 to capture the user's intent to print. That intent may be manifested through the selection of a print action such as in FIG. 4 or, for example, by interacting with a content item. Such interaction can include selecting, opening, or accessing. Upon a determination by monitor engine 36 that a printer has a desired characteristic, notification engine 34 causes the user to be notified.

Production engine 38 represents generally any combination of hardware and programming configured to cause a printer to produce a content item. Production engine 38 does so only upon a determination by monitor engine 36 that the printer has a desired characteristic. Further, production engine 38 may proceed with its function automatically only after a user's section of the content item in a notification by notification engine 34. In performance of its task, production engine 38 may access or otherwise reference production data 40. Production engine 38 may render the content item to a print ready format and communicating the rendered content to the printer. Production engine 38 may communicate the content item itself or a reference for acquiring the content item to the printer or to an intermediary the renders the content item for the printer.

Figure 3:
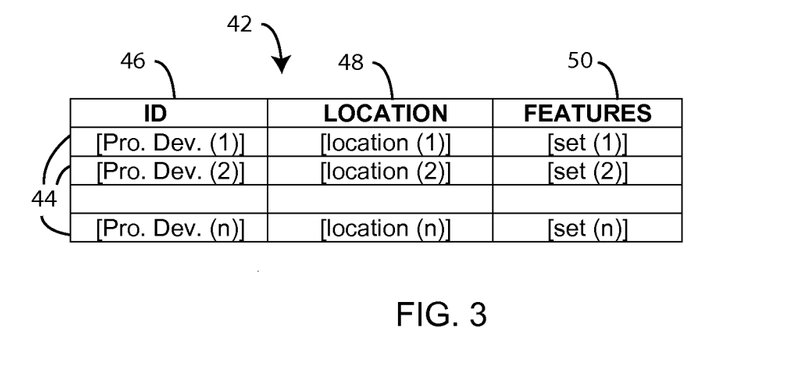
FIG. 3 depicts a characteristic table according to an embodiment.

In FIG. 3, characteristic data 42 is depicted as including table 46 having an entry 44 for each of a plurality of printers. Each entry 44 includes data identifying a given printer in field 46, data identifying a location of that printer in field 48, and data identifying features of the printer in field 50. Data in field 46 may identify the printer by a user defined name, model, network address, physical address, or any other information that can be used to distinguish the corresponding printer from other printers. Data in field 48 may identify a geographic location of a corresponding printer, a network or domain on which the printer resides, a network address, or any other information that can be uses to determine if a client device under a user's control is within a desire proximity to the printer. Data in field 50 may identify the features of a corresponding printer in a positive fashion or negatively by identifying those features the printer does not have or the features that are not currently operational. Thus, an offline printer may be identified as having no features.

In determining if a printer has a desired characteristic, monitor engine 36 may compare a known location of a client device under a user's control with the location data identified in fields 48 of entries 44. Where the client device is a smart phone, the location of the device may be discerned from the phone's carrier or a position application running on the device. Where a client device is more fixed, the location may be discerned from its network address, information provided by a user, or even a database that defines its location. To determine if a printer has a desired feature, monitor engine 36 may compare the requirements for producing a content item with the features data in field 50 of entries 44. The requirements may be specified by the user or discerned from the content item itself.

Figure 4:
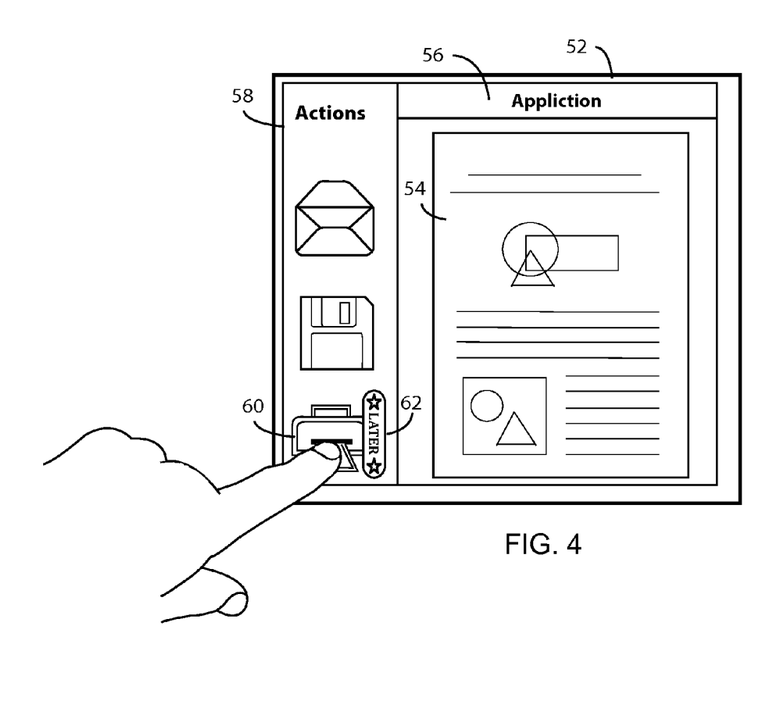
FIG. 4 depicts an example screen view in which, a user is instructing the delayed printing of a content item according to an embodiment.

FIG. 4 depicts a screen view 52 displayed to a user of a client device. Screen view 52 includes a representation of content item 54 opened by application 56. Screen view 52 also includes a number of iconic representations of actions 58 a user can instigate to control the operation of application 56. One of those action is the printing of the content item through the selection of print icon 60. In this example, print icon 60 includes a modification 62 to indicate that monitor engine 36 has determined that none of a plurality of printers has a desired characteristic. Thus, the user's selection of print icon 60 will trigger capture engine 34 to capture the user's intent to print content item 54.

In one example, monitor engine 36 may be responsible for adding modification 62 to print icon 60. When a printer has a desired characteristic, modification 62 will not appear, and selection of print icon 60 will lead to the more immediate production of content item 54. In another example, modification 62 is a permanent feature, and print icon 60 has a dedicated function of being used to trigger the capture of a user's intent to print when a printer is not available.

Figure 5:
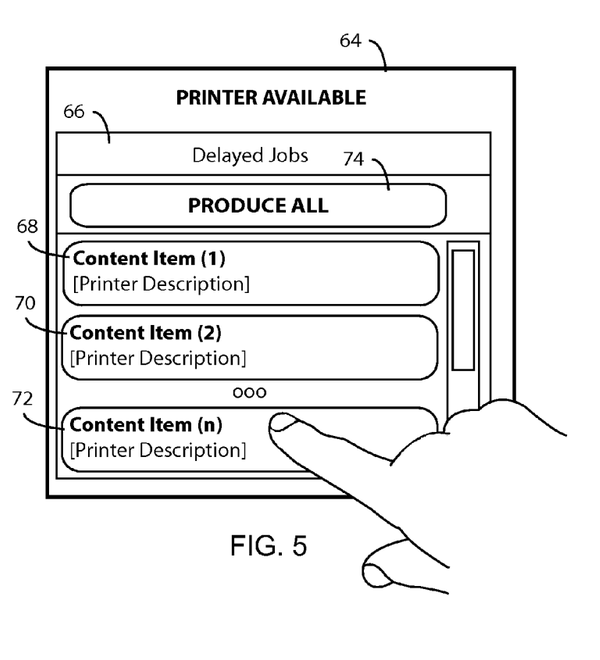
FIG. 5 depicts an example screen view in which a user is notified that a printer having a desired characteristic is available according to an embodiment.

FIG. 5 depicts a screen view 64 of a notification 66 displayed to a user of a client device. Notification 66 alerts a user of client device that one or more printers having desired characteristics are available to produce content items. Notification engine 34 may cause notification 66 to be displayed automatically upon detection by monitor engine 36 that a printer has a desired characteristic with respect to one or more content items for which a user's intent to print has been captured. In another example, notification engine 34 may communicate some other message that alerts a user of the client device to open or otherwise access notification 66. Such a communication may be an e-mail, a text message, an alert tone, an icon, or any other communication that can garner a user's attention.

In the example of FIG. 5, notification 66 includes user selectable controls 68-74. Controls 68-72 allow for the individual selection of content items (1) through (n). The presumption here is that a user's intention to print these content items was captured during a time period when none of a plurality of printers had a desired characteristic. At a later time, monitor engine 36 detected that a printer had a desired characteristic. The same or different printers may be identified by notification 66 for each of content items (1) through (n). Selection of a given control 68-72 triggers production engine 38 to cause a corresponding printer to produce a corresponding content item. Selection of control 74 triggers production engine 38 to cause the production of all content items (1) through (n).

In foregoing discussion, various components were described as combinations of hardware and programming. Such components may be implemented in a number of fashions. Looking at FIG. 6, the programming may be processor executable instructions stored on tangible memory media 76 and the hardware may include a processor 78 for executing those instructions. Memory 76 can be said to store program instructions that when executed by processor 78 implement delayed content production system 30 of FIG. 2. Memory 76 may be integrated in the same device as processor 78 or it may be separate but accessible to that device and processor 76.

Figure 6:
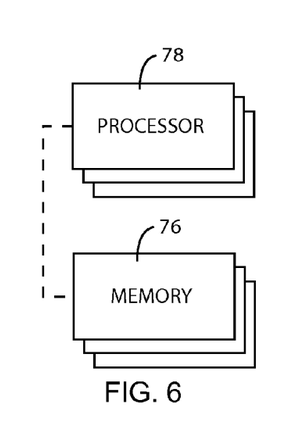
FIG. 6 is a block diagram depicting a memory and a processor according to an embodiment.

In one example, the program instructions can be part of an installation package that can be executed by processor 78 to implement system 30. In this case, memory 76 may be a portable medium such as a CD, DVD, or flash drive or a memory maintained by a server from which the installation package can be downloaded and installed. In another example, the program instructions may be part of an application or applications already installed. Here, memory 76 can include integrated memory such as a hard drive.

Figure 7:
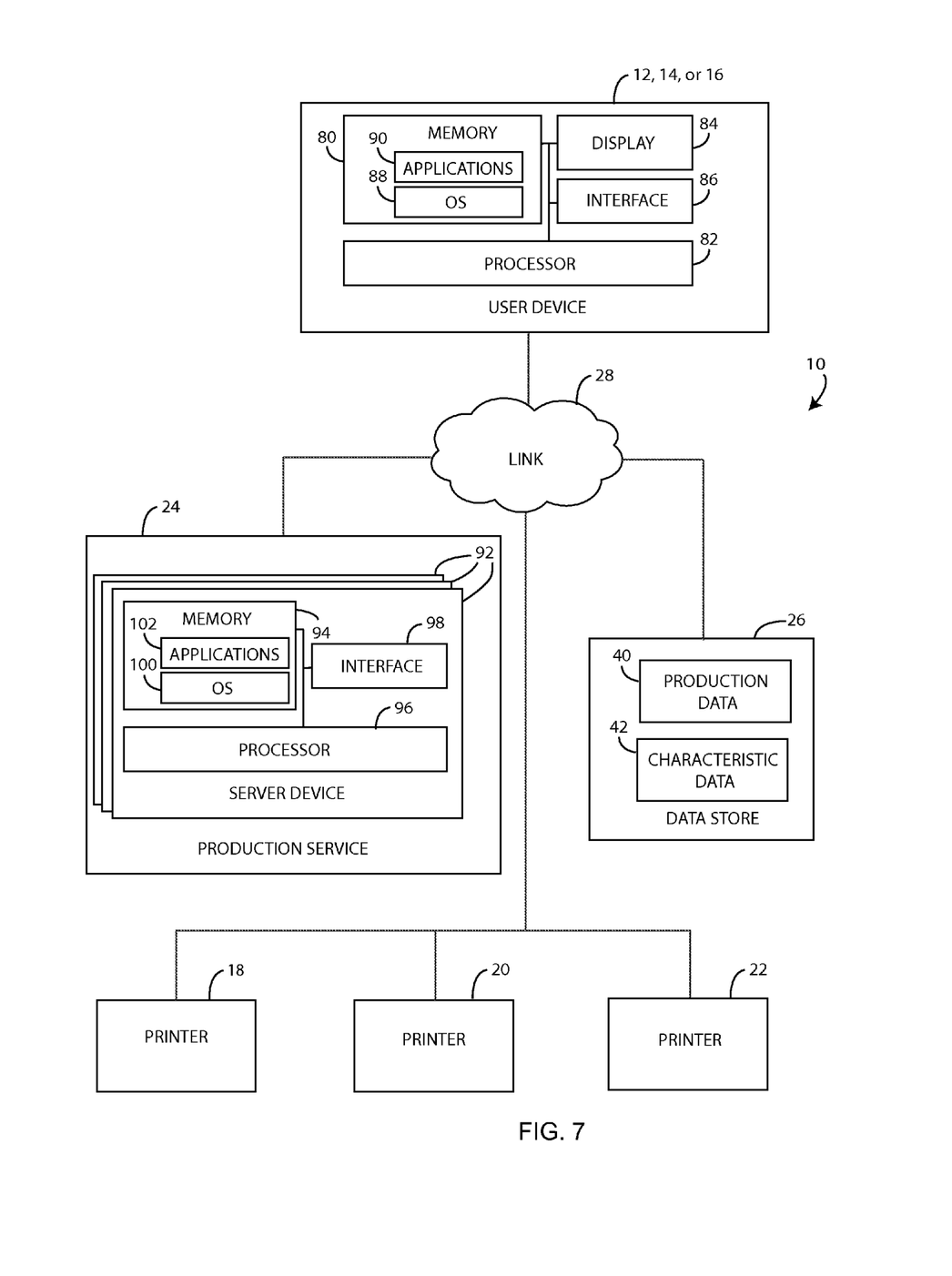
FIG. 7 is a block diagram depicting the physical and logical elements of a client device, production service, and data store according to an embodiment.

As a further example, FIG. 7 depicts a block diagram illustrating various elements of client device 12, 14, or 16, resource service 20, and data store 22. Client device 12 is shown to include memory 80, processor 82, display 84, and interface 86. Processor 82 represents generally any processor configured to execute program instructions stored in memory 80 to perform various specified functions. Display 84 represents generally any display device capable of presenting a graphical user interface to a viewer. Display 84, for example, may be a touch screen responding to a viewer's touch to select user interface controls such as controls 60 and 68-74 of FIGS. 4 and 5. Interface 86 represents generally any wired or wireless interface enabling client device 12, 14 of 16 to communicate via link 28.

Memory 80 is shown to include operating system 88 and applications 90. Operating system 88 represents a collection of programs that when executed by processor 82 serve as a platform on which applications 90 can run. Examples of operating systems include, but are not limited, to WebOS, Microsoft's Windows®, Linux®, and Android. Applications 90 represent program instructions for various functions of client device 12, 14, or 16. Such instructions relate to functions such as web browsing, document viewing, and printing.

Production service 24 is shown to include a number of server devices 92. Each server device includes memory 94, processor 96, and interface 98. Processor 96 represents generally any processor configured to execute program instructions stored in memory 94 to perform various specified functions. Interface 98 represents generally any wired or wireless interface enabling that server device 92 to communicate via link 28.

Memory is shown to include operating system 100 and applications 102. Operating system 100 represents a collection of programs that when executed by processor 96 serve as a platform on which applications 102 can run. Examples of operating systems include, but are not limited, server versions of Microsoft's Windows® and Linux®. Applications 102 represent program instructions for various functions of a given server device 92. Such instructions relate to functions such as assisting client device 12, 14, or 16 in causing printers 18-22 to product content items.

Looking at FIG. 2, engines 32-38 are described a combinations of hardware and programming. The hardware portions may, depending on the embodiment, be implemented as processor 82, processor 96, or a combination of both. The programming portions, depending on the embodiment can be implemented by operating system 88, applications 90, operating system 100, applications 102, or combinations thereof.

Figure 8:
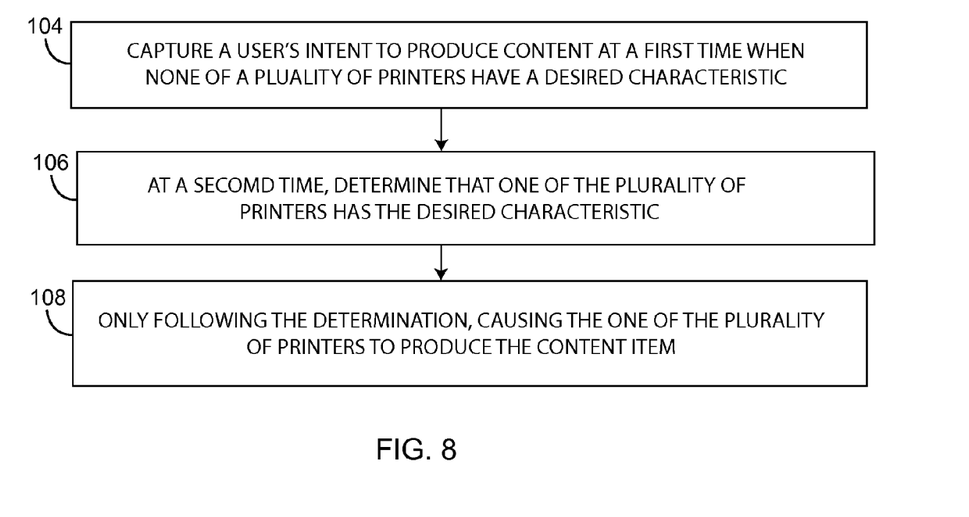
FIG. 8 is a flow diagram depicting steps taken to implement an embodiment.

Operation:

FIG. 8 is an exemplary flow diagram of steps taken to implement an embodiment. In discussing FIG. 8, reference may be made to the diagrams of FIGS. 1-7 to provide contextual examples. Implementation, however, is not limited to those examples. FIG. 8 begins with capturing a user's intent to produce a content item (step 104). The intent is captured at a first time when none of a plurality of printers has a desired characteristic. Referring to FIG. 2, step 104 may be implemented by capture engine 32. Step 104 can include storing or causing to be stored the content item itself, a reference such as an URL for retrieving the content item, or a representation of the content item. Such a representation may be a version of the content item rendered in a print ready format.

FIG. 4 depicts an example in which step 104 is triggered by a user selecting print icon 60 which results in capture engine 32 capturing a user's intent to print content item 54. In another example, step 104 may be triggered by a user accessing or otherwise interacting with the content item.

Referring to FIG. 7, where capture engine 32 is implemented on client device 12, 14, or 16, step 104 can include communicating the content item, a reference for acquiring the content item or a representation of the content item to be stored as production data 40. Production data 40 may be stored locally on the client device 12, 14, or 16 when a network connection is not available and in a central repository when a connection is or becomes available. Where capture engine is implemented on production service 24, step 104 can include acquiring the content item or representation thereof from client device 12, 14, or 16 or using a reference acquired from client device 12, 14, or 16.

Continuing with FIG. 8, it is determined, at a second later time, that one of the plurality of printers has the desired characteristic (step 106). Referring to FIG. 2, step 106 may be implemented by monitor engine 36. Printer characteristics can include locations and features. A desired characteristic can be a user specified feature or a feature that is compatible with the content item. Examples include color and photo printing capabilities. Other examples include duplexing and binding. Step 106 can include determining that the one of the plurality of printers has the desired feature. Desired feature may be discerned by examining the content item. For example, the content item may be a photograph, so a desired feature may be photo printing. The desired feature may be specified explicitly by a user or through a recognition of user habits. Referring to FIG. 3, the features of a printer can be discerned from characteristic data 42.

When the characteristic in question includes location, step 106 can include determining that the user and the one of the plurality of printers share the location. This may be accomplished by detecting that the client device under the user's control and the particular printer are on a common network, subnet, or domain. Step 106 may include determining that the user and the printer a geographically proximate to one another using positioning data for the client device under the user's control and a known location of the printer. Where the client device is a smart phone, such position data can be acquired directly from the client device. The known location of the printer can be obtained, for example, from characteristic data 42 of FIG. 3.

In a particular example, a user's intent to print the content item may be captured when the user is in control of a first device such as client device 12 or 14 of FIG. 2. Later a user may take control of a second device such as client device 16 of FIG. 2 that shares a location with a particular printer—a kiosk at a print service provider, for example. Step 106 can then include detecting that the particular printer has the desired characteristic upon detecting the user to be in control of that second device. Control may be discerned when a user logs into the second device or access an application or web service using the second device.

Continuing with FIG. 8, the one of the plurality of printers is caused to produce the content item only following the determination in step 106 (step 108). Referring to FIG. 2, production engine 38 may be responsible for implementing step 108. Referring to FIG. 7, step 108 may include accessing or otherwise referencing production data 40. Step 108 may include rendering the content item to a print ready format and communicating the rendered content to the printer. Step 108 may include communicating the content item itself or a reference for acquiring the content item to the printer or to an intermediary the renders the content item for the printer.

Step 104 can include capturing a user's intent to print a plurality of content items during a time frame in which none of a plurality of printers has a desired characteristic. In such a case, step 106 includes determining that one of the plurality of printers has a desired characteristic with respect to one or more of the plurality of content items. Step 108 then includes causing the printer to produce the one or more of the plurality of content items.

The method depicted in FIG. 8 can include, prior to step 108, causing the user to be notified that the content item can be produced with the one of the plurality of printers determined to have the desired characteristic in step 106. Referring o FIG. 2, this additional step may be implemented by notification engine 34. Step 108 may then be performed automatically only upon receiving an indication to produce the content item following the notification. Upon receiving an indication to print after a user selection. FIG. 5 depicts an example of such a notification where a user is able to provide an indication to print upon selecting one or more of the controls 68-74. Where the intent to print has been captured for a plurality of content items, step 108 may include automatically causing the one of the plurality of printers to produce only those of the plurality of content items selected following the notification.

CONCLUSION

The diagrams of FIGS. 1-7 show the architecture, functionality, and operation of various embodiments. Various components illustrated in FIG. 2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any tangible media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a flash drive, a hard drive, random access memory (RAM), read-only memory (ROM), erasable programmable read-only memory, a compact disc, and digital video disc.

Although the flow diagram of FIG. 8 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A delayed content production method, comprising:
   determining whether any of a plurality of printers shares a location of a client device;
   in response to a determination that none of the plurality of printers shares the location of the client device, causing a modification to be added to a print icon displayed on the client device, wherein the modification indicates that none of the plurality of printers shares the location of the client device;
   capturing a user's intent, via the print icon containing the modification displayed on the client device, to produce a content item at a first time when none of a plurality of printers shares the location of the client device;
   at a second time, determining that one of the plurality of printers shares the location of the client device;
   only following the determination that one of the plurality of printers shares the location of the client device, sending a notification to the client device comprising the content item;
   receiving a selection of the content item of the notification; and
   causing the one of the plurality of printers that shares the location of the client device to produce the selected content item.

2. The method of claim 1, wherein determining that one of the plurality of printers shares the location of the client device includes determining that the client device is connected to a communication network utilized by the one of the plurality of printers.

3. The method of claim 1, wherein determining that one of the plurality of printers shares the location of the client device includes analyzing positioning data of the client device.

4. The method of claim 1, further comprising, prior to the selected content item being produced, causing the user to be notified, via the client device, that the content item can be produced with the one of the plurality of printers determined to share the location of the client device and wherein causing the one of the plurality of printers to produce the selected content item comprises automatically causing the one of the plurality of printers to produce the selected content item only upon receiving an indication to produce the content item following the notification.

5. The method of claim 1, wherein:
capturing comprises receiving data indicative of the content item and the sharing of the location from a first device under the user's control; and
determining comprises determining that the one of the plurality of printers shares the location of the client device upon indication that the user is in control of a second device.

6. The method of claim 1, wherein:
the first time is a first time frame that precedes the second time;
capturing comprises capturing the user's intent to print a plurality of content items during the first time frame;
sending comprises sending a notification to the client device comprising the plurality of content items;
receiving comprises receiving a selection of the plurality of content items; and
causing the one of the plurality of printers comprises causing the one of the plurality of printers to produce the selected plurality of content items.

7. The method of claim 6, further comprising, prior to any of the selected plurality of content items being produced, causing the user to be notified, via the client device, that the plurality of content items can be produced with the one of the plurality of printers determined to share the location of the client device and wherein causing the one of the plurality of printers to produce the selected plurality of content items comprises automatically causing the one of the plurality of printers to produce only those of the plurality of content items selected following the notification.

8. A non-transitory processor readable medium storing instructions that when executed by a processor implement:
a capture engine to capture a user's intent to produce a content item via a print icon displayed on a client device at a first time when none of a plurality of printers shares the location of the client device;
a monitor engine to
determine, prior to the first time, that none of the plurality of printers shares the location of the client device;
cause a modification to be added to the print icon displayed on the client device, wherein the modification indicates that none of the plurality of printers shares the location of the client device;
determine, at a second time, whether one of the plurality of printers shares the location of the client device;
a notification engine to send a notification to the client device comprising the content item following a determination that one of the plurality of printers shares the location of the client device and receive a selection of the content item contained in the notification; and
a production engine to cause the one of the plurality of printers that shares the location of the client device to produce the selected content item in response to receiving the selection.

9. The non-transitory processor readable medium of claim 8, wherein the monitor engine is to determine when the client device is connected to a communication network utilized by the one of the plurality of printers.

10. The non-transitory processor readable medium of claim 9, wherein the sharing of the location of the client device includes a feature and the monitor engine is to determine that the one of the plurality of printers has the feature.

11. The non-transitory processor readable medium of claim 8, wherein the notification engine is to cause the user to be notified, prior to the selected content item being produced, that the content item can be produced with the one of the plurality of printers determined to share the location of the client device, and wherein the production engine is to automatically cause the one of the plurality of printers to produce the selected content item only upon receiving an indication to produce the content item following the notification being sent.

12. The non-transitory processor readable medium of claim 8, wherein:
the capture engine is to capture a user's intent to produce the selected content item by receiving data indicative of the content item and the sharing of the location from a first device under the user's control; and
the monitor engine is to determine that the one of the plurality of printers shares the location of the client device upon an indication that the user is in control of a second device.

13. The non-transitory processor readable medium of claim 8, wherein:
the first time is a first time frame that precedes the second time;
the capture engine is to capture the user's intent to print a plurality of content items during the first time frame;
the notification engine is to send a notification to the client device comprising the plurality of content items;
the notification engine is to receive a selection of the plurality of content items; and
the production engine is to cause the one of the plurality of printers to produce the selected plurality of content items.

14. The non-transitory processor readable medium of claim 13, wherein the notification engine is to cause the user to be notified, prior to any of the selected plurality of content items being produced, that the plurality of content items can be produced with the one of the plurality of printers determined to share the location of the client device, and wherein the production engine is to automatically cause the one of the plurality of printers to produce only those of the plurality of content items selected following the notification.

15. A delayed content production system, comprising:
a capture engine to capture a user's intent, via a print icon displayed on a client device, at a first location to produce a content item at a first time when none of a plurality of printers shares the location of the client device;
a monitor engine to
determine, prior to the first time, that none of the plurality of printers shares the location of the client device;
cause a modification to be added to the print icon displayed on the client device, wherein the modification indicates that none of the plurality of printers shares the location of the client device;
determine, at a second time, that one of the plurality of printers shares the location of the client device
a notification engine to send a notification to the client device comprising the content item following a determination that one of the plurality of printers shares the location of the client device and receive a selection of the content item contained in the notification; and
a production engine to cause the one of the plurality of printers that shares the location of the client device to produce the selected content item only following the determination by the monitor engine.

16. The system of claim 15, wherein the notification engine is to cause the user to be notified, prior to the selected content item being produced, that the content item can be produced with the one of the plurality of printers determined to share the location of the client device, and wherein the production engine is to automatically cause the one of the plurality of printers to produce the content item only upon receiving an indication to produce the content item following the notification.

17. The system of claim 15, wherein:
the capture engine is to capture a user's intent to produce the selected content item by receiving data indicative of the content item and the sharing of the location from a first device under the user's control; and
the monitor engine is to determine that the one of the plurality of printers has shares the location of the client device upon indication that the user is in control of a second device.

18. The system of claim 15, wherein:
the first time is a first time frame that precedes the second time;
the capture engine is to capture the user's intent to print a plurality of content items during the first time frame;
the notification engine is to send a notification to the client device comprising the plurality of content items;
the notification engine is to receive a selection of the plurality of content items; and
the production engine is to cause the one of the plurality of printers to produce the selected plurality of content items.

19. The system of claim 18, wherein the notification engine is to cause the user to be notified, prior to any of the selected plurality of content items being produced, that the plurality of content items can be produced with the one of the plurality of printers determined to share the location of the client device, and wherein the production engine is to automatically cause the one of the plurality of printers to produce only those of the plurality of content items selected following the notification.

* * * * *